Figure 4:
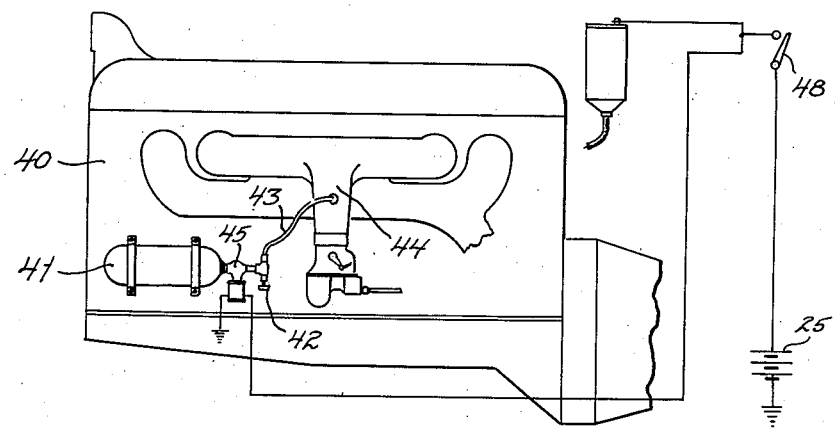

Aug. 27, 1940.    F. R. ACKERMAN    2,213,132
METHOD OF CONDITIONING FUEL DURING OPERATION OF GAS ENGINES
Filed Oct. 18, 1938    2 Sheets-Sheet 1
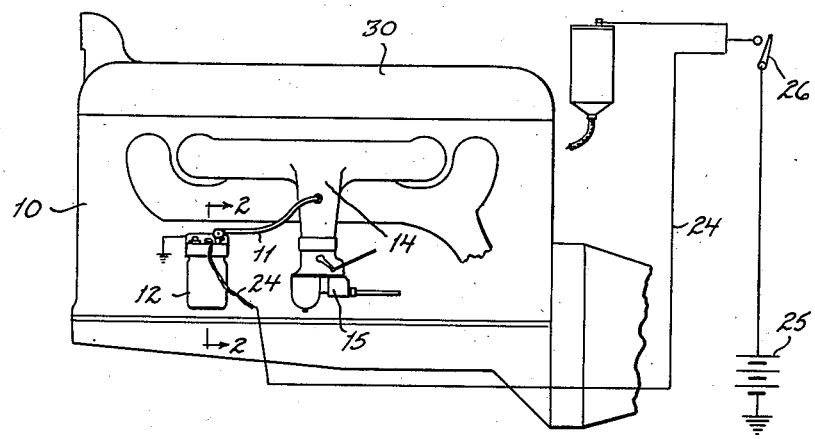
*Fig. 1*
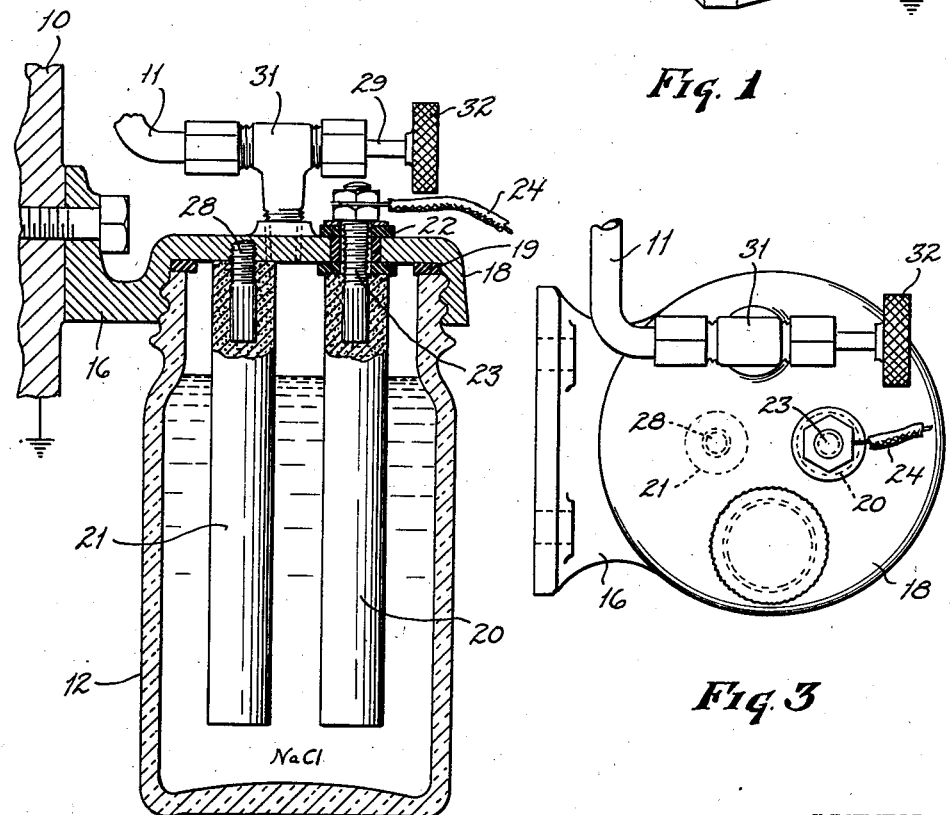
*Fig. 2*    *Fig. 3*
INVENTOR.
FRANCIS R. ACKERMAN
BY Bates, Goldick, & Teare
ATTORNEYS Aug. 27, 1940.　　　F. R. ACKERMAN　　　2,213,132
METHOD OF CONDITIONING FUEL DURING OPERATION OF GAS ENGINES
Filed Oct. 18, 1938　　　2 Sheets-Sheet 2

INVENTOR.
FRANCIS R. ACKERMAN
BY Bates, Boloick, & Teare
ATTORNEYS

Patented Aug. 27, 1940

2,213,132

UNITED STATES PATENT OFFICE 2,213,132

METHOD OF CONDITIONING FUEL DURING OPERATION OF GAS ENGINES

Francis R. Ackerman, Euclid, Ohio

Application October 18, 1938, Serial No. 235,698

8 Claims. (Cl. 123—119)

This invention relates to the conditioning of fuel for gas engines, whereby carbon deposits in the engine head are decreased, and the general object thereof is the provision of a method of treating the vaporized fuel after the same has passed through the engine carburetor and is mixed with air, the method comprising the utilization of a chlorine gas which will disperse and commingle with the vaporized fuel and air prior to the combustion of the fuel in the engine head.

A further object of the present invention is the provision of an apparatus, operable when the engine is in operation for electrolytically generating the chlorine gas, whereupon the same is mixed with the vaporized fuel and air as the same passes through the intake manifold of the engine to the cylinder heads of the engine.

Other objects of the present invention will become apparent from the description hereinafter set forth, reference being made to the accompanying drawings which illustrate suitable apparatus for carrying out my method of treating the vaporized fuel, for the purposes above stated.

My invention contemplates the treating of vaporized fuel and air with a chlorine gas, such, for example, as feeding such a gas into the intake manifold of a gas engine in such manner that the gas will have sufficient time to commingle with the vaporized fuel and air before the latter pass the intake valves of the engine. I have found that such a gas has a favorable influence upon the unburned deposited carbon in the cylinder head, in that the carbon becomes somewhat softened and continued use of an auxiliary gas, such as chlorine, for the purpose stated, over a period of time, eventually results in the elimination of the carbon from the cylinder heads. The chlorine may be electrolytically derived by a simple apparatus attached to the engine, or associated parts, and electrical energy for the purpose can be derived from the ignition battery of the engine. However, if desired, the chlorine can be supplied by attaching to the engine or associated parts a tank of liquified chlorine which can be suitably valved to permit gradual expansion and escape of the chlorine from the tank to the engine manifold. In the drawings, both forms of apparatus are illustrated to supply the chlorine gas to the intake manifold.

In the drawings, Fig. 1 is a side elevation of a gas engine, equipped with one form of my generating apparatus; Fig. 2 is an enlarged cross-sectional view, taken substantially along the line 2—2 of Fig. 1 of the gas generating apparatus; Fig. 3 is a top plan view of the gas generating apparatus shown in Figs. 1 and 2; and Fig. 4 is a side elevation of a gas engine, equipped with an auxiliary gas tank.

In Fig. 1 of the drawings, the gas engine 10 is shown as having a pipe line 11 extending from the container 12 of the auxiliary gas generator to the intake manifold 14 of the engine, the line 11 being connected to the manifold above the engine carburetor 15. The auxiliary gas generating apparatus 12 may be connected to the engine or to any associated part thereof and I have shown in Fig. 2 a bracket member 16 bolted directly to the engine side adjacent the carburetor 15. This bracket may also comprise a screw top closure for the container 12, formed integrally with the bracket 16. Positive and negative electrodes 20 and 21 are suitably supported by the closure portion 18 of the bracket 16; the positive electrode 20 being insulated therefrom by a flanged rubber sleeve 22. A conventional gasket 19 serves to gas seal the container. The terminal 23 of the electrode 20 is connected to a feed wire 24 which is connected to an ignition battery 25, preferably through the ignition switch 26.

The negative electrode 21 is connected directly to the closure member 18 by any suitable means such as a screw member 28, and by reason of the engine being grounded to the battery, the gas generating circuit is completed. I have found that a suitable material for the electrode may comprise carbon sticks of substantial diameter. The gas line 11 is connected to the interior of the container 12 by a needle valve 29 and associated mechanism 31, there being a conveniently exposed needle handle 32 for adjusting the passage of gas from the interior of the container 12.

When the ignition switch 26 is closed, the sodium chloride becomes electrolytically decomposed, the sodium falling to the bottom of the container from the electrode and the chlorine gas rising to the top thereof. When the engine is running, and the valve member 29 is properly adjusted, the chlorine is electrolytically generated within the container 12 and is drawn to the intake manifold 14 of the engine through the pipe line 11, and becomes commingled in the manifold with the vaporized fuel and air before reaching the intake valve of the engine.

In Fig. 4 I have shown attached to the side of the engine 40 a tank 41 which may contain liquid chlorine which is expanded and liberated through a valve member 42 to a gas line 43, the latter being connected to the intake manifold 44 of the engine. If desired, a defroster apparatus 45, comprising a resistance coil, may be associated with the outlet end of the tank 41 to prevent freezing of the outlet and valve 42, due to expansion of the liquifying fluid. In this arrangement the defroster mechanism 45 may also comprise a solenoid-operated valve which will close the tank 41 when the ignition switch 48 is opened.

It will be noted that in both arrangements by controlling the flow of the chlorine gas through electrical means controlled by the ignition switch, danger of the chlorine escaping into the engine manifold 14 and the head of the engine when the engine is not in operation, is eliminated.

While I make no claim as to the merits of the invention disclosed in increasing the power output and combustion characteristics of the treated fuel, nevertheless dynometer tests have disclosed that no detrimental effects result by the introduction of the chlorine insofar as power output and combustion are concerned. In fact, such tests disclose that there was an increase of from 4 to 5% per gallon of fuel consumed when only that amount of chlorine was introduced which became available by the electrolytic generization of chlorine from an aqueous solution of sodium chloride while using the ignition battery of the engine as a source of electrical energy.

I claim:

1. The method of decarbonizing cylinder heads in gas engines utilizing a carbon-forming fuel, comprising feeding into the fuel gases at the intake manifold of the engine while the engine is in operation, a vaporized chlorine gas, to cause the same to commingle with a vaporized fuel and air prior to combustion of the fuel.

2. A method of treating a carbon-forming vaporized gas engine fuel, comprising feeding into the fuel gas at the intake manifold of the engine while the engine is in operation, vaporized chlorine.

3. The method of decarbonizing cylinder heads of gas engines utilizing a carbon-forming fuel, comprising the feeding into the fuel gas at the intake manifold of the engine while the engine is in operation, of chlorine gas.

4. The method of decarbonizing cylinder heads of gas engines utilizing a carbon-forming fuel, comprising generating chlorine gas by the electrolytic decomposition of sodium chloride while the engine is in operation and injecting the generated chlorine into the vaporized fuel gas and air as the same pass to the cylinder heads of the engine.

5. The method of treating a hydrocarbon fuel for use in an internal combustion engine, comprising generating a quantity of chlorine vapor gas by the chemical decomposition of a chlorine compound in an aqueous solution and feeding the gas into the fuel vapor before it enters the engine, to thereby decarbonize the combustion chamber.

6. The method of treating a carbon-forming fuel for use in an internal combustion engine, comprising storing a quantity of chlorine vapor gas in a sealed container and subsequently feeding the gas into the fuel vapor supply before it enters the engine, to thereby decarbonize the combustion chamber.

7. The method of treating a carbon-forming fuel for use in an internal combustion engine, comprising storing a quantity of chlorine vapor gas in a sealed container and subsequently withdrawing the gas into the fuel vapor supply before it enters the engine by the suction created at the intake manifold, to thereby decarbonize the combustion chamber.

8. The method of treating a carbon-forming fuel for use in an internal combustion engine, comprising generating a quantity of chlorine vapor gas in a closed container and withdrawing a quantity of the gas into the fuel vapor supply before it enters the engine by the suction created in the intake manifold, to thereby decarbonize the combustion chamber.

FRANCIS R. ACKERMAN.